(12) United States Patent
Watters

(10) Patent No.: US 6,231,127 B1
(45) Date of Patent: May 15, 2001

(54) AUTOMOBILE WHEEL WITH TWISTED LINK LACE SPOKES

(76) Inventor: Stephen Watters, 840 Storer Ave., Akron, OH (US) 44308

( * ) Notice: Subject to any disclaimer, the term of this patent is extended or adjusted under 35 U.S.C. 154(b) by 0 days.

(21) Appl. No.: 09/397,271

(22) Filed: Sep. 16, 1999

(51) Int. Cl.[7] ........................................... B60B 1/02
(52) U.S. Cl. ........................ 301/55; 301/73; 301/74; 301/75
(58) Field of Search .................. D12/204, 205, D12/207, 208, 209; 301/54, 55, 73, 74, 75, 79, 80

(56) References Cited

U.S. PATENT DOCUMENTS

| | | | |
|---|---|---|---|
| 301,144 | * | 7/1884 | Orcutt ........................................ 301/55 |
| 396,262 | * | 1/1889 | Boland ....................................... 301/55 |
| 520,845 | * | 6/1894 | Ray .......................................... 301/55 |
| 725,014 | * | 4/1903 | Westover ................................... 301/55 |
| 1,113,577 | * | 10/1914 | Redfield .................................... 301/55 |
| 4,917,162 | * | 4/1990 | De Longcamp ..................... 301/55 X |

* cited by examiner

Primary Examiner—Russell D. Stormer
(74) Attorney, Agent, or Firm—John D. Gugliotta; Michael J. Corrigan

(57) ABSTRACT

This invention is an ornamental design for wheel rims of cars and trucks. The design is in the shape of tire chains that are twisted and simulate wheel spokes. These twisted link lace rims are manufactured out of 4140 grade steel and conventional stainless steel. Additionally, the chain design could be chrome or gold plated for decorative value.

13 Claims, 5 Drawing Sheets

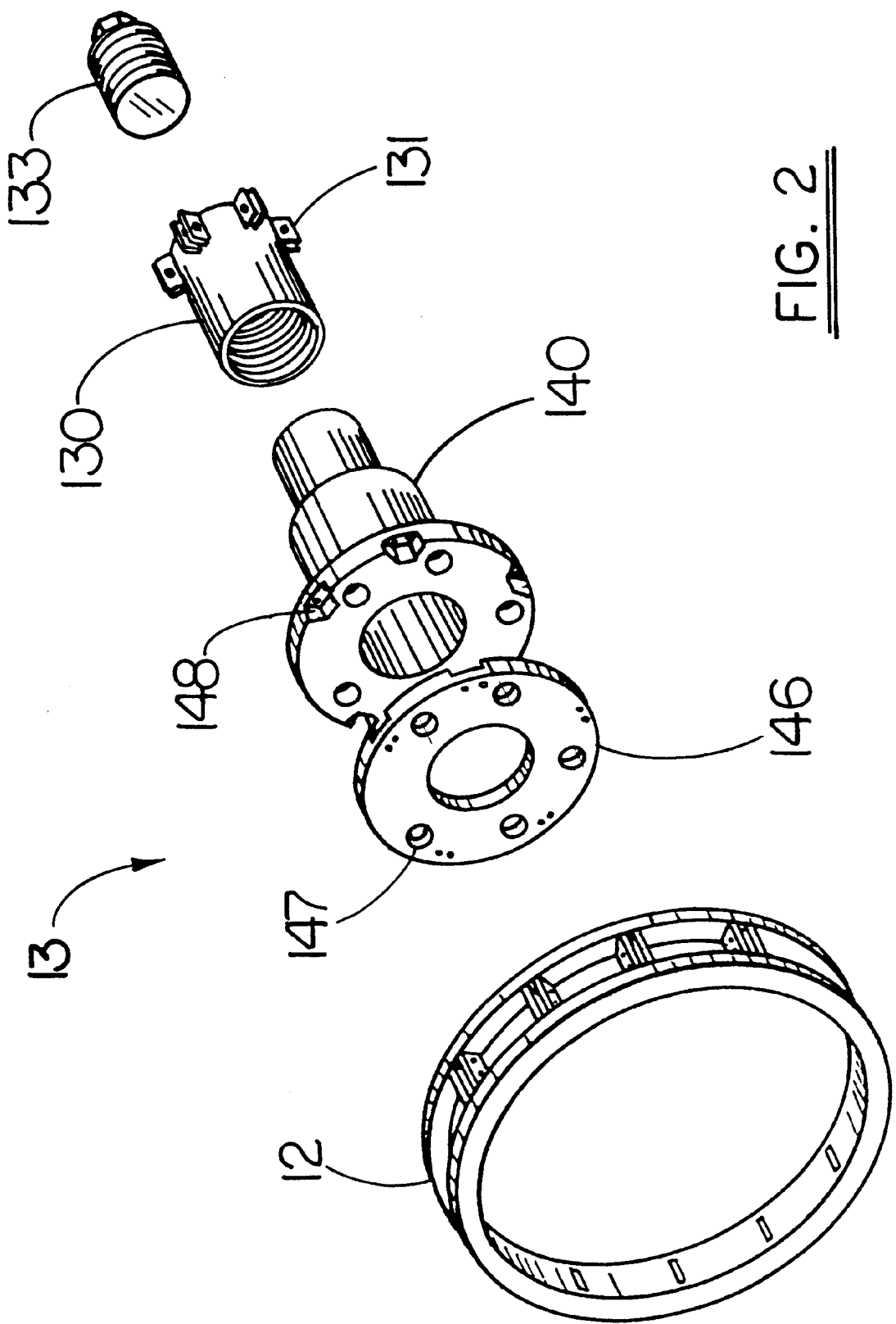

AUTOMOBILE WHEEL WITH TWISTED LINK LACE SPOKES

RELATED APPLICATIONS

There are no previously filed, nor currently any co-pending applications, anywhere in the world.

BACKGROUND OF THE INVENTION

1. Field of the Invention

The present invention relates generally to automobile wheels and, more particularly, to an automobile wheel having decorative load bearing twisted link lace replacing the conventional wire wheel spokes.

2. Description of the Related Art

In the related art, decorative wheels, particularly spoked for automobiles, are well known. Various novel ways have been developed for conventional automobile wheels having a spoked look. The problem with conventional spoked wheels is that the ends of the spokes protrude through the rim of the wheel requiring a seal on the inside of the tire rim that often leaks. Consequently, conventional tubed tires must be used. Another problem with such wheels is that the spokes require periodic adjustment to keep the proper tension between the wheel hub and outer rim. Failure to do so may cause the wheel to be dangerously unbalanced. The designs in the art solve this problem by adding a non-load bearing simulated spoke structure to a conventional automobile wheel. Examples of these type of designs can be found in U.S. Pat. No. 4,019,782 issued to Reppert, U.S. Pat. No. 3,993,357 issued to Reppert, U.S. Pat. No. 4,180,293 issued to Norris, et al., U.S. Pat. No. 4,226,478 issued to Brown, U.S. Pat. No. 4,226,479 issued to Weld, and U.S. Pat. No. 4,385,785 issued to Norris, et al. U.S. Pat. No. 4,339,859 issued to Weld is an automobile wheel manufacturing for the wheel described in '479 also issued to Weld. U.S. Pat. No. 4,529,252 is a design of a wheel having a simulated wire wheel cover.

However, many automobile owners still desire an aesthetically pleasing wheel design that functions like conventional spoked wheels yet still allows the use of conventional tubeless tires. The present invention solves this problem by replacing the load bearing spokes with a decorative load bearing twisted steel link lace design. The twisted steel link lace is pre-tensioned upon assembly and eliminates the need for periodic spoke adjustment as in conventional spoked.

SUMMARY OF THE INVENTION

It is therefore an object of the present invention to provide an automobile wheel with a unique chain-link spoke pattern.

It is a feature of the present invention to allow an automobile owner to create a customized vehicle look.

It is a feature of the present invention to provide a stylish design.

It is a feature of the present invention to provide a both a gold and silver plated design.

It is a feature of the present invention to provide a variety of sizes to fit a variety vehicles.

Briefly described according to one embodiment of the present invention, an automobile wheel with steel twisted link lace replacing the load bearing spokes of a conventional spoked automobile wheel is provided. The steel twisted link lace is pre-tensioned at the factory using a novel adjustment means incorporated into the design of the wheel center assembly. Once the lace is tensioned, the factory welds the spindle assembly in the tensioned position permanently tensioning the lace. The links in the lace are then welded to each other and to the rim forming a rigid spoke structure. The resulting assembly can then be plated in gold or silver finish.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is an exploded perspective view thereof;

| LIST OF REFERENCE NUMBERS | | | |
|---|---|---|---|
| 10 | Bull Wheel | 130a | Spindle Assembly Connection Points |
| 11 | Tire Rim | | |
| 11a | Inner Tire Rim Wall | 131 | Anchor Blocks |
| 12 | Felly Assembly | 132 | Tubular Sleeve |
| 12a | Felly Connection Points | 133 | Expansion Plug |
| 13 | Center Wheel Assembly | 134 | Expansion Plug Threads |
| 14 | Twisted Steel Link Lace Sections | 140 | Hub Assembly |
| | | 141 | Inner Tubular Sleeve |
| 120 | Outer Housing Ring | 145 | Outer Disc |
| 122 | Anchor Block Support Ring | 145a | Outer Disc Inner Surface |
| 124 | Inner Housing Ring | 146 | Inner Disc |
| 125 | Rectangular Aperture | 146a | Inner Disc Outer Surface |
| 127 | Anchor Blocks | 147 | Lug Nut Holes |
| 129 | Steel Anchor Pin | 148 | Receiving Notches |
| 130 | Spindle Assembly | 149 | Anchor Pin Aperture |

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
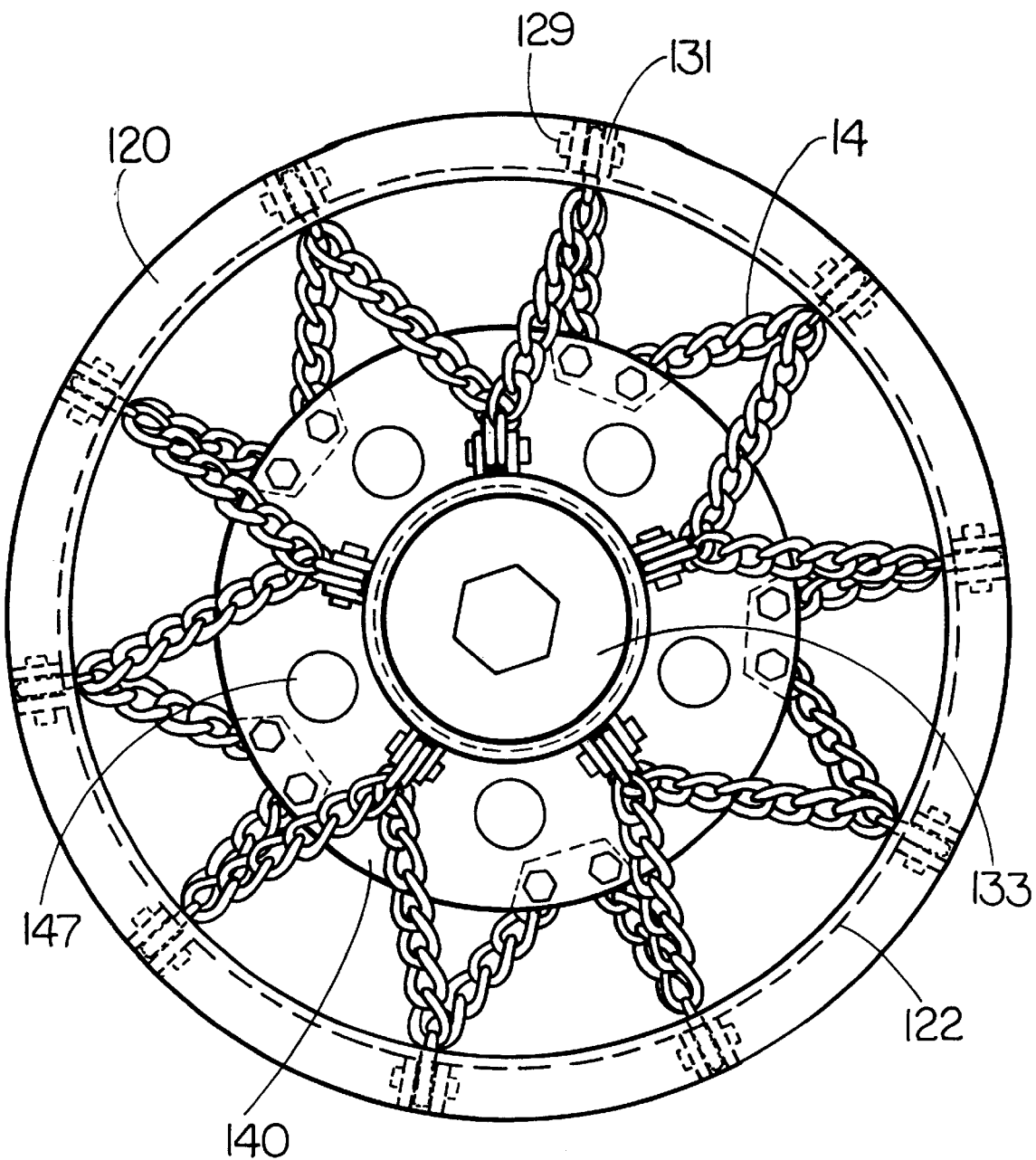
FIG. 1 a front view of an automobile wheel with twisted link lace spokes according to the preferred embodiment of the present invention.

Referring to FIG. 1, a front view of an automobile wheel with steel twisted lace spokes 10 is shown comprised of a conventional tubeless tire rim 11 with a felly assembly 12 located concentrically inward and adjacent to the inner wall 11a of tire rim 11 and integrally joined by welding. A center wheel assembly 13, comprising a spindle assembly and a hub assembly as further described below, is held at the rotational center of the wheel 10 by a plurality of twisted link lace sections 14.

Figure 3A:
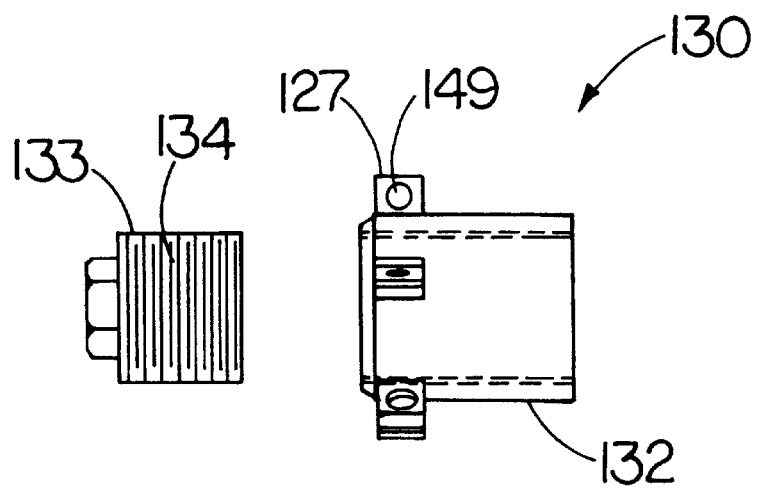
FIG. 3a. is an elevational view of the spindle assembly 130 portion of the center wheel assembly 13.
Figure 3B:
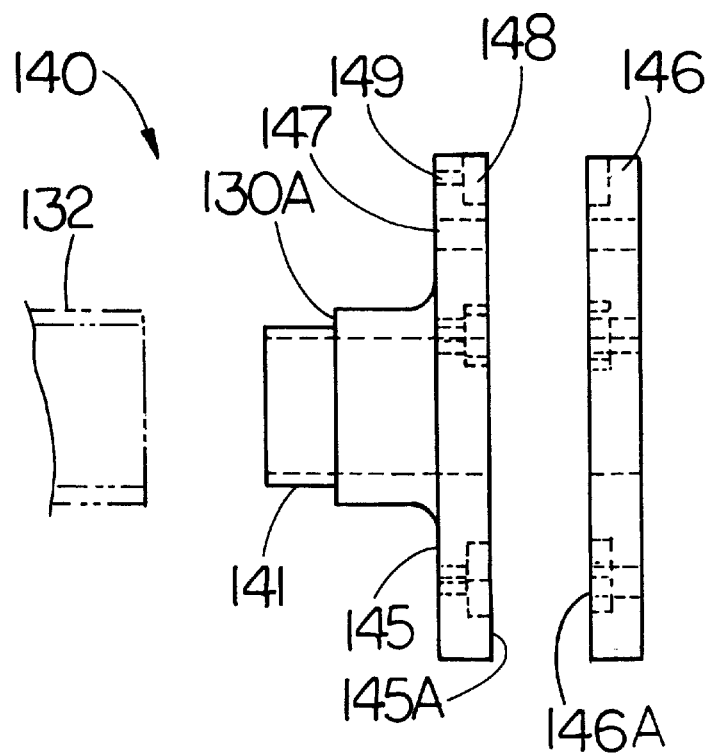
FIG. 3b. is an elevational view of the hub assembly 140 portion of the wheel assembly 13.

As further shown and described in conjunction with FIG. 2, FIG. 3a, and FIG. 3b, each center wheel assembly is formed by a spindle assembly 130 threadedly engaged in a linearly aligned manner with a hub assembly 140. Each spindle assembly 130 is formed of a series of radially spaced and aligned anchor blocks 131 placed along the outer end of a tubular sleeve 132. The tubular sleeve 132 forms a series of female threads (not shown) that receive an expansion plug 133 that has outer threads 134 for engaging with the female threads of the tubular sleeve 132.

As further shown and described, each hub assembly 140 includes an inner tubular sleeve 141 supporting in a perpendicular fashion an outer disc 145. An inner disc 146 is further provide located concentrically, adjacent to and on the inward side of an outer disc 145. Inner disc 146 is butt welded in a perpendicular fashion to one end of an outer tubular sleeve 141. The other end of the outer tubular sleeve 146 receives one end of an inner tubular sleeve 145 with the other end extending therefrom for receiving one end of a tubular sleeve 132. The threaded inner diameter of one end of tubular sleeve 132 is for both receiving the threaded expansion plug 133 and a cavity axially centered and bored into the rear side of inner disc 146 of the center wheel assembly 13 for receiving the hub of an automobile axle in an otherwise conventional manner. Further, the outer disc 146 has a plurality of lug nut holes 147 bored there through and spaced radially at 72-degrees from each other for receiving the lug nuts from an axle of an automobile and for securing the outer disc 145 and center wheel assembly 13 to said axle. The outer disc 146 of the center wheel assembly has a plurality of receiving notches 148 located adjacent to and spaced radially at 72-degrees from each other on the outer circumference of said outer disc 145 for receiving said twisted link lace 14. Further shown is a plurality of pairs of anchor pin aperture 149 located in each of said twisted link lace receiving notches 148 for securing one end of said twisted link lace 14 to the outer disc 145.

It is envisioned that the inner tubular sleeve 141 is received within the interior of the tubular sleeve 132 of the spindle assembly 130. In this manner, it is envisioned that the entire hub assembly 140 can be urged in a linear fashion upon rotation of the expansion plug 133 such that the anchor block assembly 131 can be urged away from the outer disc 145 in a steady, secure manner.

Figure 4:
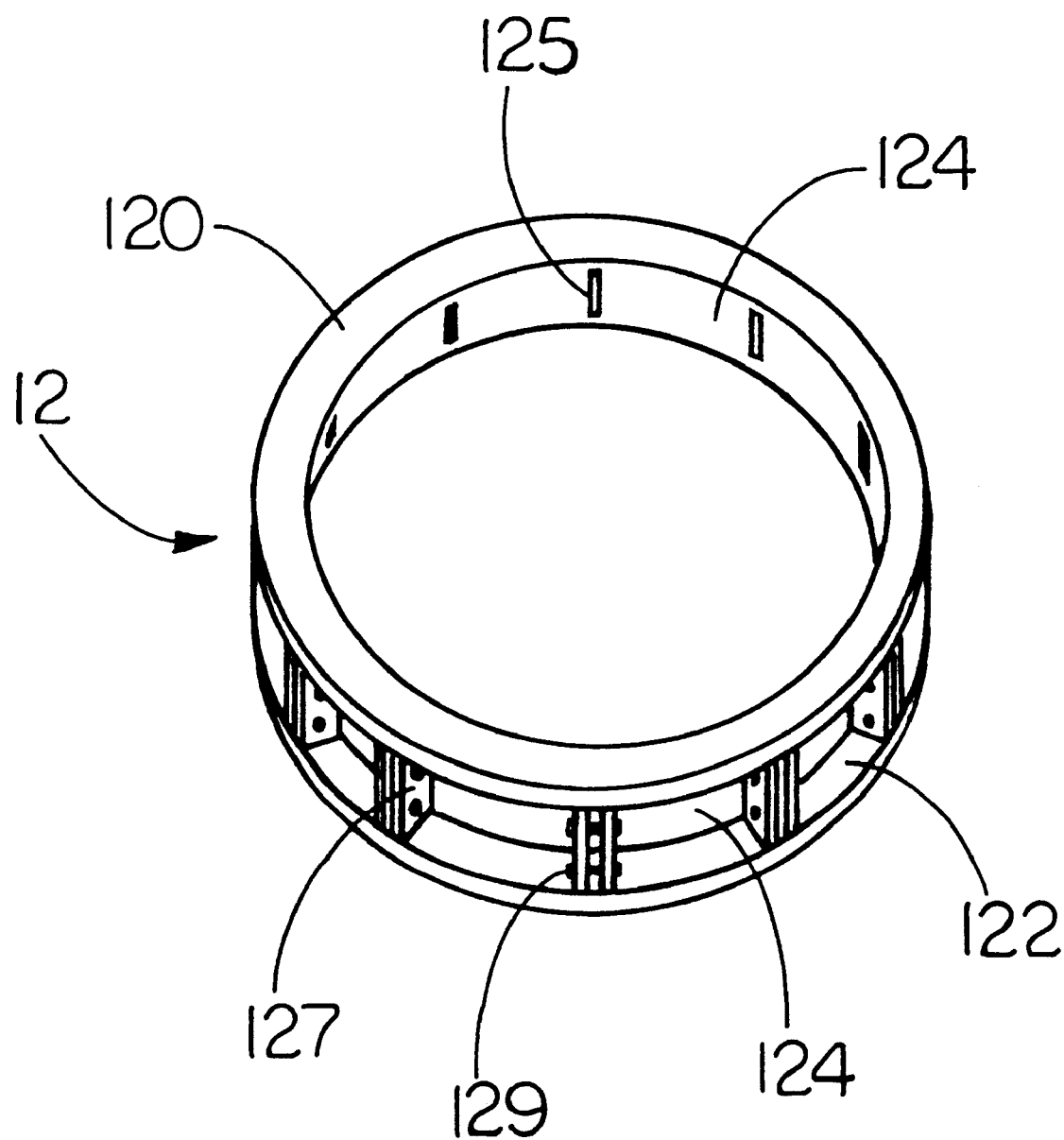
FIG. 4 is a perspective view of the felly assembly 12 of the invention.

As further shown and described in conjunction with FIG. 4, the felly assembly 12 includes an outer housing ring 120 fixedly connected concentrically to the outer diameter of an anchor block support ring 122 and inner housing ring 124 fixedly connected concentrically on the inner diameter of anchor block support ring 122. A plurality of rectangular aperture 125 are located tangentially on the outer surface of said anchor block support ring 122. In the preferred embodiment in which twenty steel twisted link lace sections 14 are utilized, each rectangular aperture 125 is spaced 72-degrees apart for receiving there through one end of said twisted link lace 14 for attachment to a pair of anchor blocks 127 located on either side and adjacent to said rectangular aperture 125. One end of steel twisted link lace 14 is fixedly connected to said pair of anchor blocks 125 by means of a steel anchor pin 129 passed through end link of twisted link lace 14 and anchor pin aperture 149 bored through anchor blocks 127.

Finally, each twisted link lace section 14 is formed as a linearly elongated length of an otherwise conventional chain and having two opposed ends. In the preferred embodiment, one end of each of twenty steel twisted link lace sections 14 are connected to ten connection points 12a spaced radially and evenly on the inner circumference of said felly assembly 12. As best shown in conjunction with FIG. 2, the other ends of ten of the twenty steel twisted link lace sections 14 are received by a spindle assembly 130 having five receiving points 130a where each receiving point 130a receives the end of two of the plurality of twenty steel twisted link lace sections 14. Of these ten link lace sections, five of the sections are five links in length while the remaining five are six links in length. The sections of varying length are placed in an alternating pattern radially around said spindle assembly 130 for the reason discussed below. The other end of the remaining ten of twenty steel twisted link lace sections 14 are received by a plurality of five notches 148 cut in the outer surface 146a of inner disc 146 and the inner surface 145a of outer disc 145 spaced radially at a distance of seventy two degrees from each other on the outer circumference of said discs 145 and 146 where each said notch 148 receives two of the ends from the plurality of said ten steel twisted link lace sections 14. Of these ten sections, five of the sections are eight links in length while the remaining five are nine links in length. Again, the steel link lace sections 14 of varying length are placed in an alternating pattern radially around said outer disc 145 for the reason discussed below.

2. Operation of the Preferred Embodiment

Figure 5:
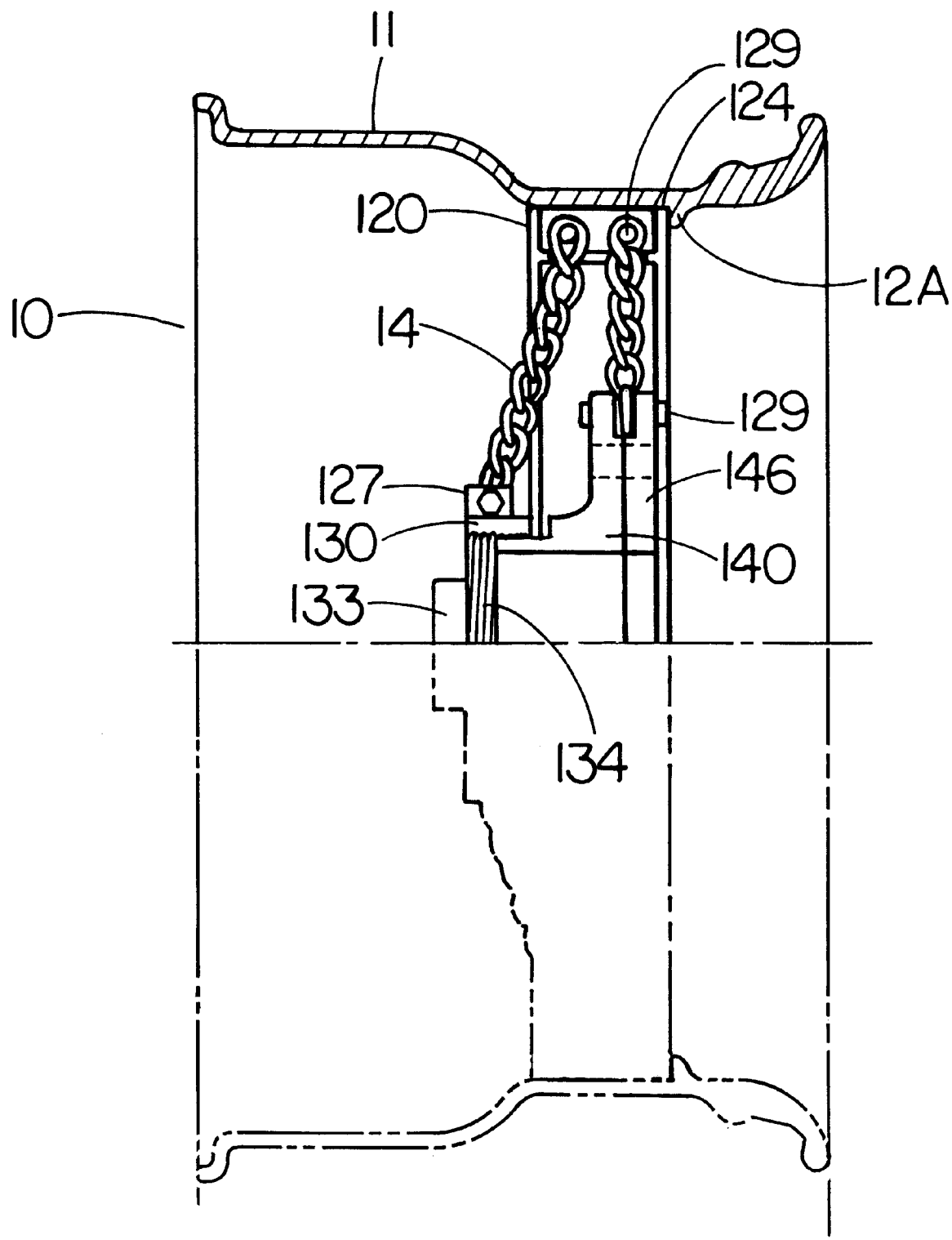
FIG. 5 is a cross sectional schematic sketch depicting the function of the assembled invention.

In operation, as best described in combination with FIG. 5, the present invention is assembled by connecting one end of the plurality of steel twisted link lace 14 to the anchor blocks 127 through the rectangular aperture 125 in the felly assembly 12 by means of an anchor pin 129. Once the pin 129 is inserted it is welded to make the attachment permanent. The other end of the plurality of steel twisted link lace 14 is connected to the anchor blocks 131 located on the spindle 130 of the center wheel assembly by means of anchor pins 129. Once both ends of the lace 14 are connected, the expansion plug 133 is inserted into the threaded end of the tubular sleeve 133 that serves as the base of the spindle assembly. As the expansion plug is screwed farther into the tubular sleeve 132, the inserted end of the plug butts up against and is biased against one end of the inner tubular assembly 141 fixedly connected to the outer disc 145 forcing further separation between the two. The net effect is to cause the spindle 130 to move further away from the inner and outer disc causing a greater distance between the aperture in the anchor blocks on the spindle and the aperture in anchor blocks on the felly causing the twisted link lace spanning between them to tension the lace. The expansion plug is torqued in this manner until a desired tension in the steel twisted link lace is reached. Because the link lace sections are of varying length in an alternating pattern radially around said spindle 130 and said outer disc 145, said spindle 130 assembly is rotated about said inner tubular sleeve 132 to give a more fashionable appearance to the design. Assembly is completed by welding adjoining links in the steel twisted link lace, welding the ends of the steel link lace to the anchor blocks, welding ends of the anchor pins to the anchor blocks, and welding the receiving end of the tubular sleeve to the outer surface of the inner tubular sleeve.

Once this is completed the expansion plug 133 is completely removed and a dummy expansion plug is inserted in its place. The resulting assembly is then placed into a conventional automobile rim 11 and the outer diameter of the felly assembly 12 is welded to the inner wall of said conventional tire rim. The assembled wheel can then be plated in gold or silver giving the invention a finished look.

What is claimed is:

1. An automobile wheel comprising:
   a tire rim;
   a felly assembly located concentrically inward and adjacent to, and in rigid mechanical contact with an inner wall of said tire rim;
   a center wheel assembly; and
   a plurality of twenty twisted link lace sections each having a pair of opposed end links, and wherein each said tisted link lace sections is affixed to both said felly assembly and said center wheel assembly such as to rigidly position and hold said center wheel assembly within a rotational centerpoint of said tire rim.

2. The automobile wheel of claim 1, wherein said center wheel assembly comprises a spindle assembly threadedly engaged in a linearly aligned manner with a hub assembly.

3. The automobile wheel of claim 2, wherein said spindle assembly further comprises:

a series of radially spaced and aligned anchor blocks placed along an outer end of a tubular sleeve;

said tubular sleeve forming a series of female threads; and an expansion plug forming outer threads for engaging with said female threads of said tubular sleeve.

4. The automobile wheel of claim 3, wherein said hub assembly comprises:

an outer disc having an outer circumerence;

an inner tubular sleeve having a first end opposite a second end and affixed to said outer disc at said first end;

an outer tubular sleeve having a first end opposite a second end; and an inner disc, said inner disc located concentrically, adjacent to and on the inward side of said outer disc and butt welded to said first end of said outer tubular sleeve.

5. The automobile wheel of claim 4, wherein said second end of said outer tubular sleeve receives said second end of said inner tubular sleeve with said second end of said inner tubular sleeve extending therefrom.

6. The automobile wheel of claim 5, wherein said inner tubular sleeve forms a threaded inner diameter for receiving an threaded expansion plug, and said inner disc further forms a cavity axially centered and bored into the rear side of said inner disc of said center wheel assembly for receiving a hub of an automobile axle.

7. The automobile wheel of claim 6, wherein said outer disc has a plurality of lug nut holes bored therethough and spaced radially at 72-degrees from each other for receiving the lug nuts from an axle of an automobile and for securing said outer disc and said center wheel assembly to said axle.

8. The automobile wheel and method for making same of claim 7, wherein said outer disc of said center wheel assembly has a plurality of receiving notches located adjacent to and spaced radially at 72-degrees from each other on said outer circumference of said outer disc for receiving said twisted link lace sections and wherein a plurality of pairs of anchor pin aperatures located in each of said twisted link lace sections receiving notches are for securing one end of said twisted link lace sections to said outer disc.

9. The automobile wheel of claim 8, wherein said inner tubular sleeve is received within an interior of said tubular sleeve of said spindle assembly and wherein said hub assembly is urged to expand in a linear fashion upon rotation of said expansion plug.

10. The automobile wheel of claim 9, wherein said felly assembly is comprised of:

an anchor block support ring having an outer surface;

an outer housing ring, said outer housing ring fixedly connected concentrically to an outer diameter of said anchor block support ring;

an inner housing ring, said inner housing ring fixedly connected concentrically on an inner diameter of said anchor block support ring a plurality of rectangular aperatures located tangentially on said outer surface of said anchor block support ring, said plurality of rectangular aperatures being spaced 72-degrees apart for receiving therethrough one end of said twisted link lace for attachment to a pair of anchor blocks located on either side and adjacent to said rectangular aperture and one end of said steel twisted link lace is fixedly connected to said pair of anchor blocks by a steel anchor pin passed through an end link of said twisted link lace and an anchor pin aperture formed by said anchor blocks.

11. The automobile wheel and method for making same of claim 10, wherein each of said twisted link lace sections is formed as a linearly elongated length of chain and having two opposed ends, one end of each twisted link lace sections is connected each to a connection point spaced radially and evenly on an inner circumference of said felly assembly and the other end of each said twenty steel twisted link lace sections are received by said spindle assembly having five receiving points where each receiving point receives the end of two of said twisted link lace sections.

12. The automobile wheel and method for making same of claim 1, wherein an outer diameter of said felly assembly is welded to an inner wall of said tire rim.

13. The automobile wheel and method for making same of claim 1, wherein said wheel is plated in gold or silver.

* * * * *